United States Patent
Ray et al.

(10) Patent No.: US 9,148,784 B1
(45) Date of Patent: Sep. 29, 2015

(54) SECURE WIRELESS DEVICE HANDOFF

(71) Applicant: Sprint Communications Company L.P., Overland Park, KS (US)

(72) Inventors: Amar Nath Ray, Shawnee, KS (US); Lyle Walter Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 57 days.

(21) Appl. No.: 14/107,251

(22) Filed: Dec. 16, 2013

(51) Int. Cl.
  *H04M 1/66* (2006.01)
  *H04W 12/04* (2009.01)
  *H04W 36/00* (2009.01)

(52) U.S. Cl.
  CPC .......... *H04W 12/04* (2013.01); *H04W 36/0055* (2013.01); *H04W 36/0066* (2013.01)

(58) Field of Classification Search
  CPC ............ H04W 12/04; H04W 36/0055; H04W 36/0066
  See application file for complete search history.

(56) References Cited

U.S. PATENT DOCUMENTS

| | | | |
|---|---|---|---|
| 7,075,904 B1* | 7/2006 | Manish et al. | 370/312 |
| 7,191,332 B1* | 3/2007 | Pankajakshan et al. | 713/163 |
| 7,509,667 B1* | 3/2009 | Cook | 725/87 |
| 8,547,912 B1* | 10/2013 | Breau et al. | 370/329 |
| 8,965,343 B1* | 2/2015 | Paczkowski et al. | 455/411 |
| 8,984,592 B1* | 3/2015 | Paczkowski et al. | 726/4 |
| 2011/0078775 A1 | 3/2011 | Yan | |
| 2012/0221600 A1 | 8/2012 | Yan | |
| 2015/0007347 A1* | 1/2015 | Rajakarunanayake et al. | 726/28 |
| 2015/0019672 A1* | 1/2015 | Fuller et al. | 709/212 |

* cited by examiner

*Primary Examiner* — Ronald Eisner (57) ABSTRACT

Examples disclosed herein provide systems, methods, and software for rolling over a data communication from one communication network to another. In one example, a method of operating a communication network includes receiving a secure authorization request from a wireless device and authorizing the wireless device based on a security key. The method further includes determining an identifier for a previous communication network, identifying a previous security key from the previous communication network, and integrating the previous security key with the security key to facilitate communication for the wireless device.

20 Claims, 8 Drawing Sheets

SECURE WIRELESS DEVICE HANDOFF

TECHNICAL BACKGROUND

Wireless communication systems typically include wireless access systems with equipment such as wireless access nodes along with various control and routing nodes that provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchanges, web pages, streaming media, or text messages, among other communication services.

In some wireless communication systems, more than one wireless communication network can be employed across a similar geographic region, with each wireless communication network including one or more sectors of wireless coverage. For example, a first wireless network employing a first wireless communication protocol can be deployed along with a second wireless network employing a second wireless communication protocol. Separate wireless access equipment can be deployed for each wireless network, such as when a Wireless Fidelity (WIFI) network is deployed over a similar geographic area as a fourth generation Long Term Evolution (LTE) wireless network or other wireless networks.

In some examples, it may be beneficial to handoff data communications from a first network to another overlapping network. Some instances where this may be beneficial include moments when the signal strength of the first network is diminished, the speed of the overlapping network is greater, and the security is better on the overlapping network, amongst other possible beneficial handoff moments. As a result, it is necessary to efficiently, quickly, and securely transition a wireless device from the first network to the second network.

Overview

Examples disclosed herein provide systems, methods, and software for rolling over a data communication from one communication network to another. In one example, a method of operating a communication network includes receiving a secure authorization request from a wireless device and authorizing the wireless device based on a security key. The method further includes determining an identifier for a previous communication network, identifying a previous security key from the previous communication network, and integrating the previous security key with the security key to facilitate communication for the wireless device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Wireless communication devices may provide a user with a variety of different applications and processes that communicate using a wireless communication network. Such applications and processes may include voice calls, email applications, and file sharing applications, amongst other possible applications. In some examples, these applications may store and communicate sensitive data to the user, the user's business, or the user's family. Thus, when it is necessary to make a communication from the wireless communication device, it may be essential to maintain a secure connection across the wireless network.

In the present instance, a wireless communication device may migrate between two different communication networks. As a result, the wireless device may be required to handoff a communication between the networks and maintain the proper security for the device in the process. In some examples, an application on the wireless communication device may maintain "keys" or security certificates to ensure the validity of the device and the application. When the device attempts to communicate using a first wireless communication network, these keys will be verified before any communication can take place. Once the keys have been authorized, the device will then be allowed to communicate over the wireless network.

In some occurrences, the wireless communication device may transition from the first wireless communication network to a second wireless communication network, such as a transition from Long Term Evolution (LTE) to Wireless Fidelity (WIFI). When this occurs, the device may then need to be reauthorized using a second security key with the second communication network. Further, as disclosed herein, the second wireless network may obtain the security key from the first wireless network. Once obtained, the second security key can be integrated with the first security key to facilitate secure communications for the wireless device.

Figure 1:
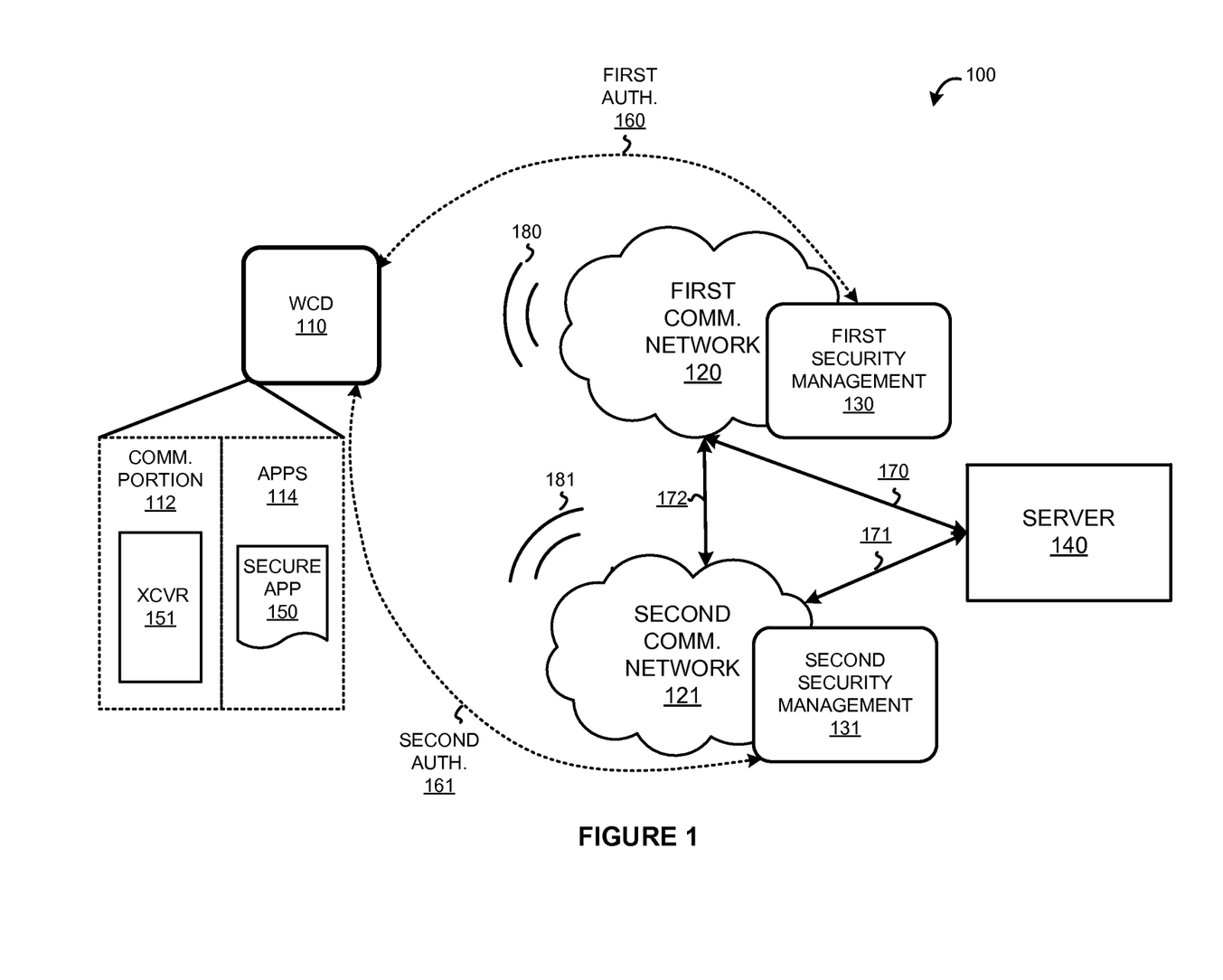
FIG. 1 illustrates a communication system for secure wireless communication device handoffs.

Turning now to FIG. 1, FIG. 1 illustrates a communication system 100 for secure wireless communication device handoffs. Communication system 100 includes wireless communication device (WCD) 110, first wireless communication network 120, second wireless communication network 121, and server 140. WCD 110 further includes a communication portion 112 and applications 114. First and second communication networks 120-121 further include first security and second security management modules 130-131. WCD 110 communicates with first communication network 120 over wireless sector 180, and further communicates with second communication network over wireless sector 181. First communication network 120 further communicates with second communication network 121 over communication link 140, and communicates with server 140 over communication link 170. Second communication network 121 communicates with server 140 over communication link 171.

In operation, secure application 150 on WCD 110 may require a data communication with server 140. Such a data communication may include transferring data to server 140, receiving data from server 140, or any other data interaction with server 140. To accomplish the data communication, WCD 110 must first establish an authorization 160 between the device and first security management module 130. This authorization may include the use of "keys" or security passphrases to ensure the identity of the device and the application.

In some examples, WCD 110 may initiate a communication using first communication network 120. Upon receipt of the initiation, first security management module 130 may return a random phrase to WCD 110 that can be used to verify the identity of the device and the application. Once received, WCD 110 will process the random phrase based on a security key and transmit the processed key back to first security management module 130. If the processed phrase matches an expected value at first security management module 130, then the communication will be accepted from WCD 110 and data may be communicated accordingly.

As data is communicated between WCD 110 and server 140, WCD 110 may necessitate a transition from first communication network 120 to second communication network 121. Based on this necessity, the wireless device may be forced to handover communication between the networks to ensure that the data connection is not lost. To accomplish the handover, WCD 110 may send a second authorization request 161 to second communication network 121 and second security management module 131. This authorization request may be used to initiate the verification of the device, the application, and the communication using a key or security passphrase in the same manner as first authorization 160.

Once the device has been authenticated by second communication network 121 and second security management module 131, WCD 110 may then forward a first communication network identifier to second communication network 121. In some examples, WCD 110 may forward the identifier without being requested by second communication network 121. In other instances, second communication network 121 may inquire WCD 110 for the identifier. Upon the receipt of the identifier from WCD 110, second communication network 121 is then configured to retrieve the first security key or passphrase from first communication network 120. This first key from first authorization 160 may then be integrated with the second key from second authorization 161 to ensure WCD 110 is allowed to communicate with server 140 through second communication network 121.

For example, WCD 110 may use a first key to communicate with server 140 over first communication network 120. This first key may be used to verify the identity of WCD 110 to server 140. Upon the transition to second communication network 121, the combination of the first security key and the second security key may be used to continue the verification of WCD 110 to server 140, and allow the rollover of communications from first communication network 120 to second communication network 121.

Figure 2:
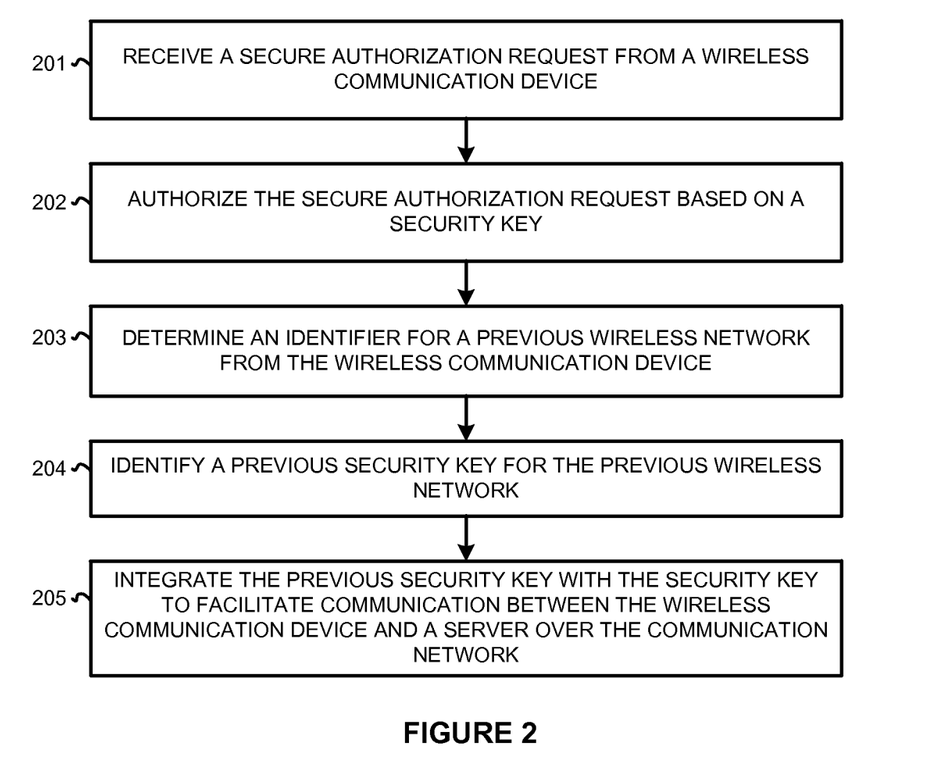
FIG. 2 illustrates a method for secure wireless communication device handoffs.

To further illustrate the operation of communication system 100, FIG. 2 is included that demonstrates a method of operating second communication network 121 to securely handoff WCD 110 from first communication network 120. The method includes, receiving a secure authorization request 161 from WCD 110 (201). This request is used to initiate the rollover from first communication network 120 to second communication network 121. In operation, WCD 110 may initiate a data communication with first communication network 120 using a first security key. First communication network 120 may be used to provide data communications to WCD 110 in a first coverage area. However, as WCD 110 changes its geographical location, it may become more effective for the device to connect to second communication network 121. This transition to second communication network 121 may occur as a result of a lack in signal strength from first communication network 120, improved data rates provided by second communication network 121, improved signal strength from second communication network 121, or for any other communication factor.

Once the secure authorization request has been received by second communication network 121 and second security management module 131, second communication network 121 will then verify WCD 110 using a second security key (202). In some examples, second security management module 131 may be used to forward a random value to WCD 110. WCD may then use the second security key to process the random value and return the processed value to second communication network 121. This returned value may then be compared with an expected value in second security management module 131 to verify WCD 110.

Upon the verification of WCD 110, second communication network 121 is then configured to determine an identifier for first communication network 120 from WCD 110 (203). In some examples, second communication network 121 may inquire WCD 110 for the identity of the other communication network. In other instances, WCD 110 may volunteer the identity of the other communication network without the need of an inquiry.

The method further includes, based on the network identification, identifying the first security key for first communication network 120 (204). In some examples, the first security key may reside in a first security management module 130 that is a function or device within first communication network 120. In other examples, the first security key may reside on the end server itself, such as when WCD is communicating using Voice over Long Term Evolution or VoLTE. In these circumstances, second communication network 121 may communicate a request through first communication network 120 to receive the security key from server 140.

Once the security key has been gathered, second communication network 121 is then configured to integrate the first security key with second security key to facilitate communication of WCD 110 and server 140 (205). In some instances, server 140 may be configured to only communicate data if all of the security keys for a device are identified. As a result, it may be necessary for the communication networks to provide all of the keys to server when they rollover the communication.

Figure 3:
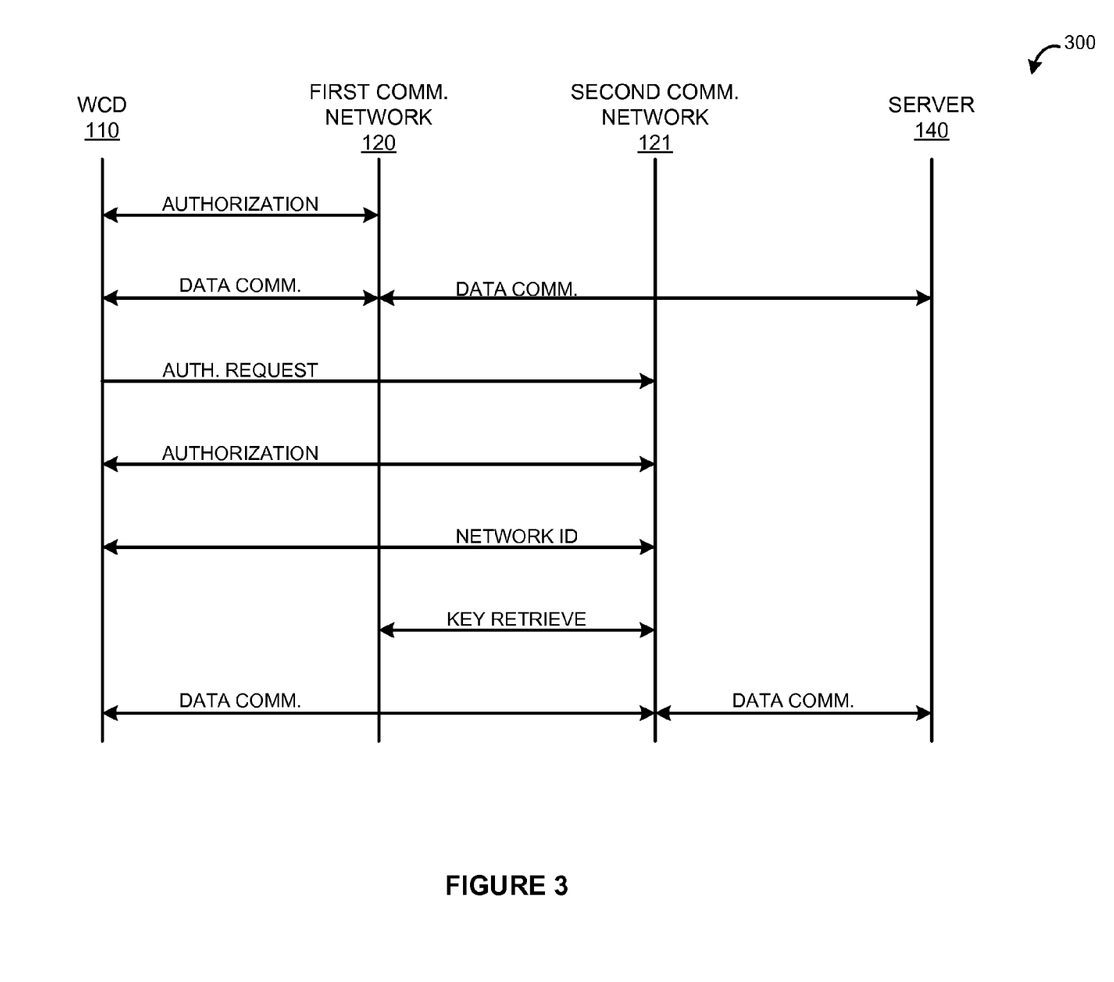
FIG. 3 illustrates a timing diagram for secure wireless communication device handoffs.

As a further illustration of communication system 100, FIG. 3 is included that demonstrates a timing diagram 300 for secure wireless device handoffs. As illustrated in timing diagram 300, WCD 110 may require a data communication for an application on the device. When this communication is required, the device may first be authorized by first communication network 120 using a first security key. Once the device is authorized, WCD 110 is then configured to communicate data with server 140 using first communication network 120.

In some examples, WCD 110 may require a transition or handoff between wireless networks as a result of the movement of WCD 110. This handoff could occur when there is a loss in signal strength from first communication network 120, when there is a faster data rate from second communication network 121, when there is increased signal strength from second communication network 121, or any other handoff factor. Once the handoff is necessary, WCD 110 will then communicate a second authorization request to second communication network 121. Second communication network 121 will then authorize the device based on a second security key. In some examples, second communication network 121 may transfer a random value to WCD 110 for WCD 110 to process using the second security key. Once the random value is processed, the processed value may then be returned to second communication network 121 to be compared with an expected result.

After the comparison and the authorization of the device, second communication network 121 is configured to determine the identity of first communication network 120. In some instances, second communication network 121 may request WCD 110 for the identity of the other communication network. In other occurrences, WCD 110 may be configured to automatically pass the identity of first communication network 120.

Once the identity of first communication network 120 is determined, second communication network 121 is then configured to gather the first security key from the network. This first security key is then incorporated with the second security key to allow communications between WCD 110 and server 140 over second communication network 121.

By compiling the security keys, security can be better maintained as the device moves between communication networks. Thus, although illustrated with two communication networks in the present example, it should be understood that the process of gathering security keys from previous networks may be repeated as many times as necessary to complete the communication. For example, if WCD 110 were to move to a third communication network, the third communication network could gather the security keys from the second communication network to ensure security.

Figure 4:
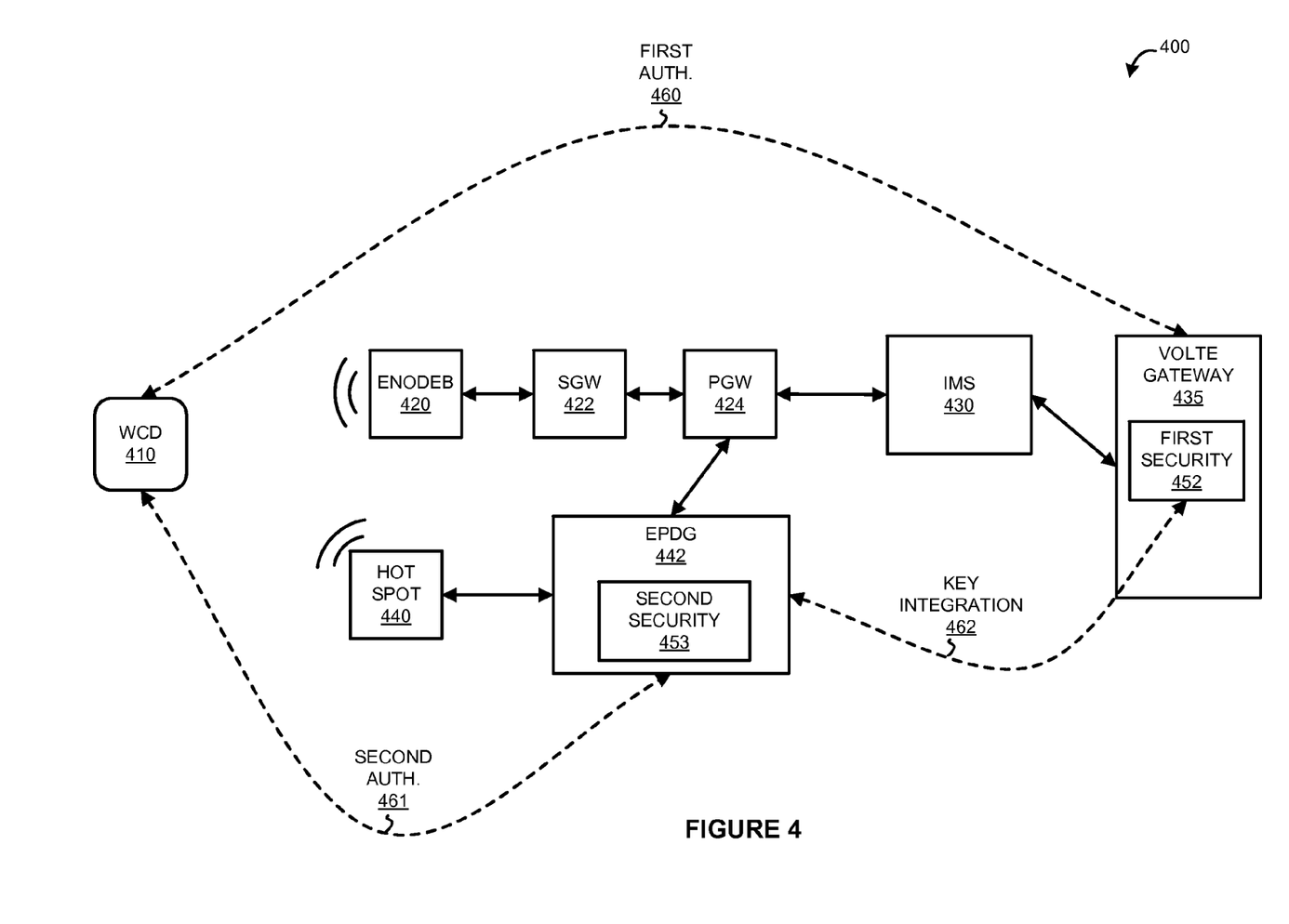
FIG. 4 illustrates a communication system for secure wireless communication device handoffs.

Turning now to FIG. 4, FIG. 4 illustrates a communication system 400 with the ability to securely roll over device communications. Communication system 400 includes wireless communication device (WCD) 410, eNodeB 420, serving gateway (SGW) 422, packet data network gateway (PGW) 424, IP multimedia core network subsystem (IMS) 430, hot spot 440, evolved packet data gateway (ePDG) 442, and Voice over Long Term Evolution gateway (VoLTE GW) 435. In the present example, eNodeB 420, SGW 422, and PGW 424 are used to provide Long Term Evolution or LTE communication to WCD 410. IMS 430 is used to provide IP multimedia services to various wireless communication devices and is intended to aid the access of multimedia and voice applications from the wireless terminals. Hot spot 440 and ePDG 442 are used to help in facilitating Wireless Fidelity (WIFI) communication to WCD 410. In the present example, ePDG 442 is configured to communicate with PGW 424 to provide access to IMS applications for WCD 410. VoLTE GW 435 is used to provide VoLTE communication to wireless communication devices, such as WCD 410, and is one example of server 140. VoLTE GW 435 further includes first security module 452 and ePDG 442 further includes second security module 453.

In operation, a user of WCD 410 may require a VoLTE communication that uses VoLTE gateway 435 to communicate with another device. To make this voice call, WCD 410 must complete first authorization 460 with VoLTE gateway 435. In some instances, first authorization 460 may include a hashing using keys between WCD 410 and VoLTE gateway 435. This hashing may include the transfer of a random value from VoLTE gateway 435 to WCD 410. Once received at WCD 410, WCD 410 may process the random value using the first security key and return the processed value to VoLTE gateway 435. The returned processed value can then be compared with an expected value by VoLTE gateway 435 to determine if the communication is authorized. Upon authorization, WCD 410 may then transmit VoLTE communications to VoLTE gateway 435 using eNodeB 420, SGW 422, PGW 424, and IMS 430.

Once the communication has commenced, WCD 410 may determine that it is desirable to change communication networks to continue the call. As illustrated in communication system 400, when this occurs, WCD 410 is configured to establish second authorization 461 with second security module 453 on ePDG 442. Similar to first authorization 460, second authorization 461 may use hashing and a second security key to establish the authorized connection. Upon the connection being authorized, ePDG 442 will then determine an identifier for the first wireless communication network that the device was connected to. In some examples, WCD 110 may pass the identity of the first wireless communication network to ePDG 442. In other instances, ePDG 442 may inquire WCD 410 about the identity of the first wireless communication network.

In addition to or in place of determining the identifier for the first wireless communication network, ePDG 442 may be configured to receive other location identifiers. These other location identifiers may include the identity of VoLTE GW 435, the identity of PGW 424, or any other relevant location identifier for retrieving previous security keys.

Based on the identifier supplied by WCD 410, ePDG 442 may then communicate with PGW 424 to identify the first security key for the communication. PGW 424 may then communicate with IMS 430 and VoLTE gateway 435 to determine the first security key that was used by WCD 410. Once identified, ePDG 442 may then integrate this first security key with the second security key that was verified using second security module 453. By integrating the two security keys, an added layer of security is created between the device and VoLTE gateway 435. As a result, the device can be verified during each wireless communication network transition, and can be traced back to all previous communication networks.

Figure 5:
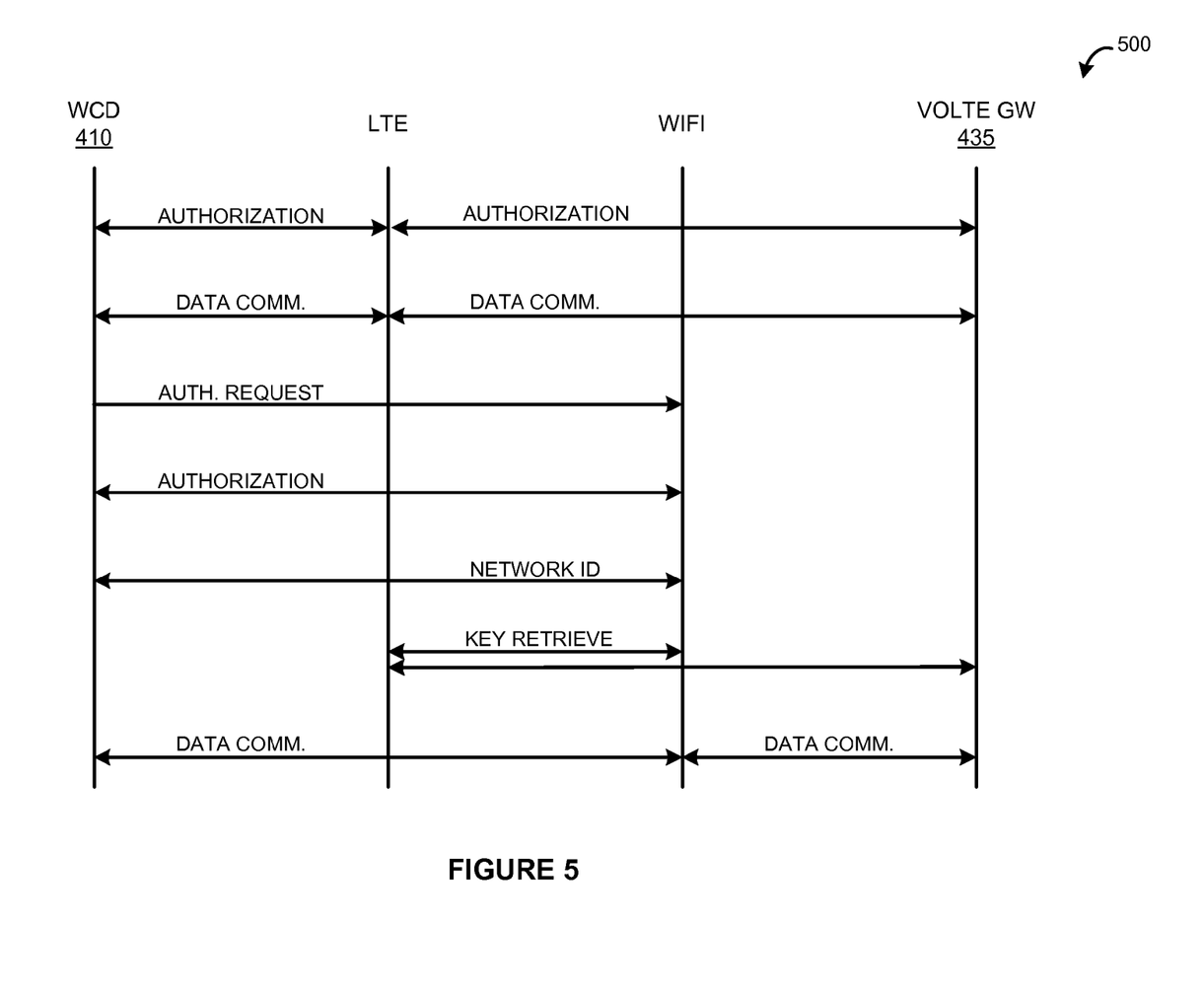
FIG. 5 illustrates a timing diagram for secure wireless communication device handoffs.

To further demonstrate the operation of communication system 400, FIG. 5 is included that illustrates a timing diagram 500 for a secure rollover of a wireless communication device between wireless networks. As illustrated in timing diagram 500, WCD 410 may request a VoLTE communication using the LTE communication network. To accomplish this communication, WCD 410 must first be authorized by VoLTE gateway 435 before data communications can begin. In some examples, this authorization may include hashing and a first security key between WCD 410 and VoLTE gateway 435. Once authorized, the device may begin the call across the LTE network.

After the call has been initiated, WCD 410 may request to be handed off to a WIFI network that is made up of hot spot 440 and ePDG 442. Such a handoff may occur when the signal strength of the LTE network has diminished, the speed of the WIFI network is greater, the security level on the WIFI network is better, amongst other possible handoff moments. Once the request to be handed off has been received by the WIFI network, the WIFI network will then authorize the device using hashing and a second security key. Upon authorization, the WIFI network will determine the identity of the LTE network that WCD 410 was first connected to. This identification may come automatically from WCD 410, or may requested from WCD 410 by the WIFI communication network.

Once the identity of the LTE communication network is known, the WIFI network may then communicate with the LTE network to retrieve the first security key from VoLTE gateway 435. This security key may then be integrated with the second security key to communicate with VoLTE gateway 435. Referring back to FIG. 4 as an example, WCD 410 will communicate with ePDG 442 using hot spot 440. EPDG 442 is then configured to communicate, using the first and second security keys, with PGW 424 to pass communications to VoLTE gateway 435.

Figure 6:
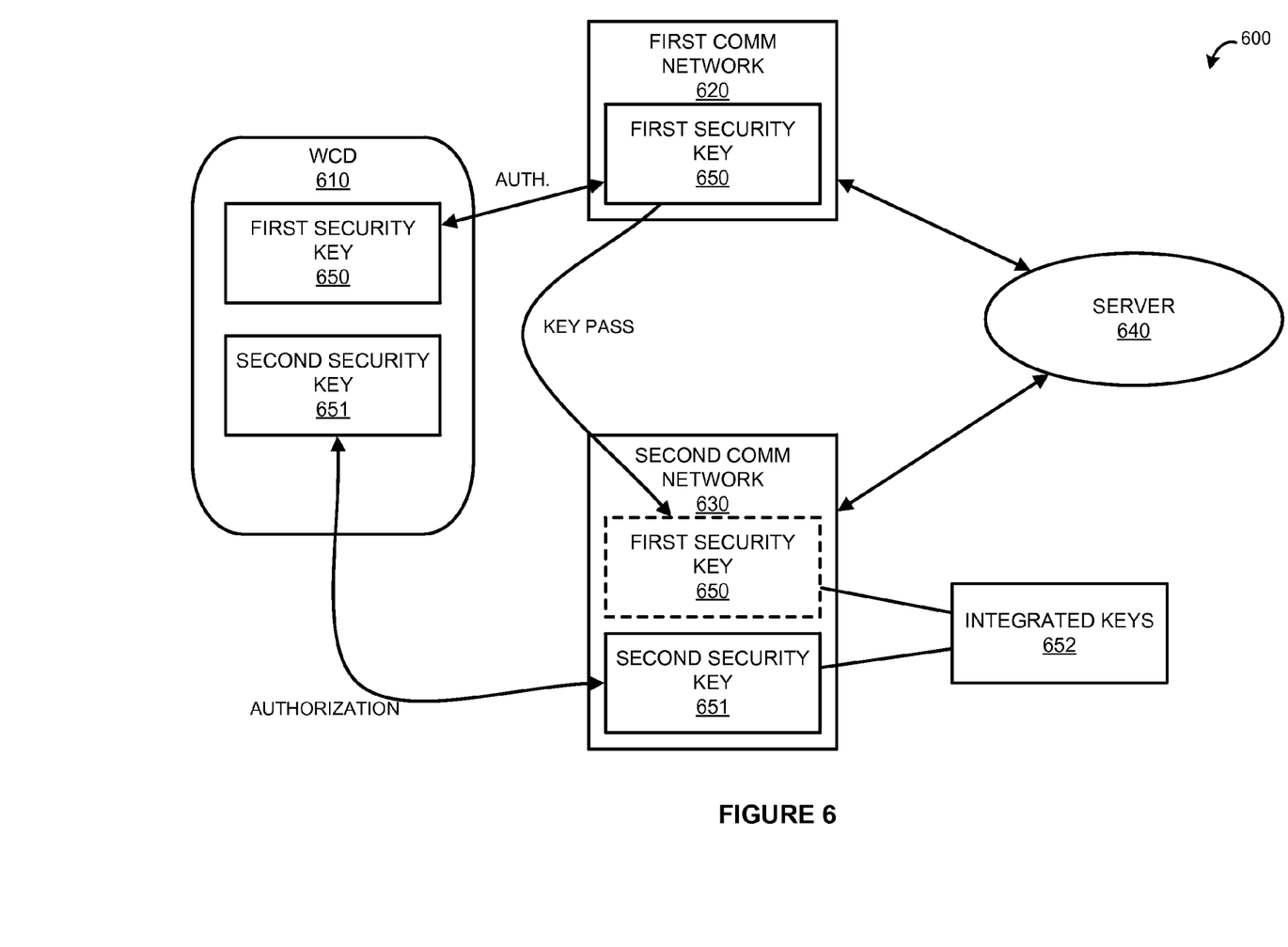
FIG. 6 illustrates an overview of a secure wireless communication device network handoff.

Referring now to FIG. 6, FIG. 6 illustrates an overview 600 of handing off a wireless device between two wireless communication networks. Overview 600 includes wireless communication device (WCD) 610, first communication network 620, second communication network 630, and server 640. Overview 600 further includes first security key 650, second security key 651, and integrated keys 652.

In operation, WCD 610 will be authorized to communicate with first communication network 620 using first security key 650. First security key 650 may include any passphrase or other security measure that can be used with hashing between first communication network 620 and WCD 610. Once the device has been authorized on first communication network 620, the device may then look to be handed off to another communication network, such as second communication network 630. To accomplish the handoff, WCD 610 will need to be reauthorized using hashing and second security key 651. In some examples, the hashing may include second communication network 630 communicating a random value to WCD 610. WCD 610 will then process this random value using second security key 651 and pass a result to second communication network 630. Second communication network 630 can then compare the result to an expected result to determine if the device is authorized.

Once WCD 610 has been authorized by second communication network 630, second communication network 630 is then configured to retrieve first security key 650 from first communication network 620. In some instances, second communication network 630 may inquire WCD 610 about the identity of the other communication network. In other examples, WCD 610 may automatically pass the identity of the other communication network. Based on the network identity provided by WCD 610, second communication network 630 can then request the key from first communication network 620. Once retrieved, first security key 650 can then be incorporated with second security key 651 to generate integrated keys 652.

In some examples, the integrated keys are required for second communication network 630 to communicate with server 640. By integrating the keys, it ensures that the various communication networks have authorized each handoff for the device. Further, although not illustrated in overview 600, it should be understood that WCD 610 may handoff to any number of communication networks. As a result, on each handoff, the new communication network will be responsible for gathering previous security keys from the prior networks.

Figure 7:
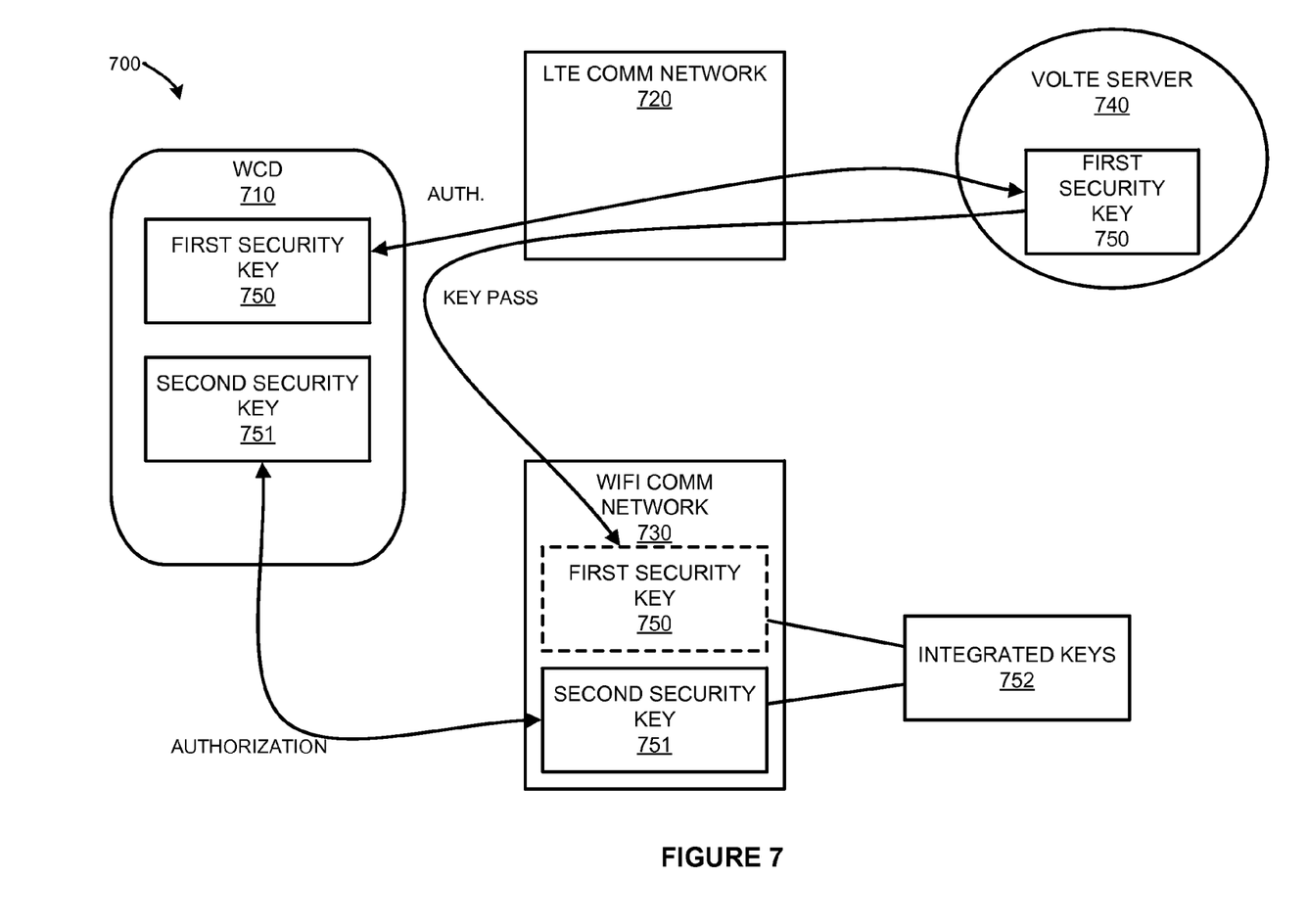
FIG. 7 illustrates an overview of a secure wireless communication device network handoff.

As an alternative example, FIG. 7 is included that illustrates an overview 700 of handing off a wireless device between wireless communication networks. Overview 700 includes wireless communication device (WCD) 710, LTE communication network 720, WIFI communication network 730, and VoLTE server 740. VoLTE server 740 is an example of VoLTE gateway 435, although other examples may exist.

Similar to the operation of overview 600 described in FIG. 6, WCD 710 may require a data communication using a communication network. In the present example, WCD 710 requires a VoLTE communication with VoLTE server 740 using LTE communication network 720. Instead of verifying the device using LTE communication network 720, WCD 710 will be verified using VoLTE server 740 and a first security key.

Upon authorization of the communication, WCD 710 may desire to transition to another communication network, such as WIFI communication network 730. When this transition or handoff is required, WCD 710 will authorize itself on WIFI communication network 730 using secure communication key 751. Once authorized, WIFI communication network 730 will then gather first security key 750 from VoLTE server 740. In some examples, WCD 710 may automatically transfer the identity of the previous communication network to WIFI communication network 730 to allow the gathering of the security keys. In other instances, WIFI communication network 730 may be required to request the identity of the previous network from WCD 710.

Once the keys are gathered, the device may then continue the data communication using WIFI communication network 730. Although illustrated with two communication networks in the present example, it should be understood that WCD 710 may transfer to any number of communication networks. For example, after switching to WIFI communication network 730, WCD 710 may then switch back to another LTE communication network. This other LTE communication network would then be required to identify the previous security keys that were used in creating the connections.

Figure 8:
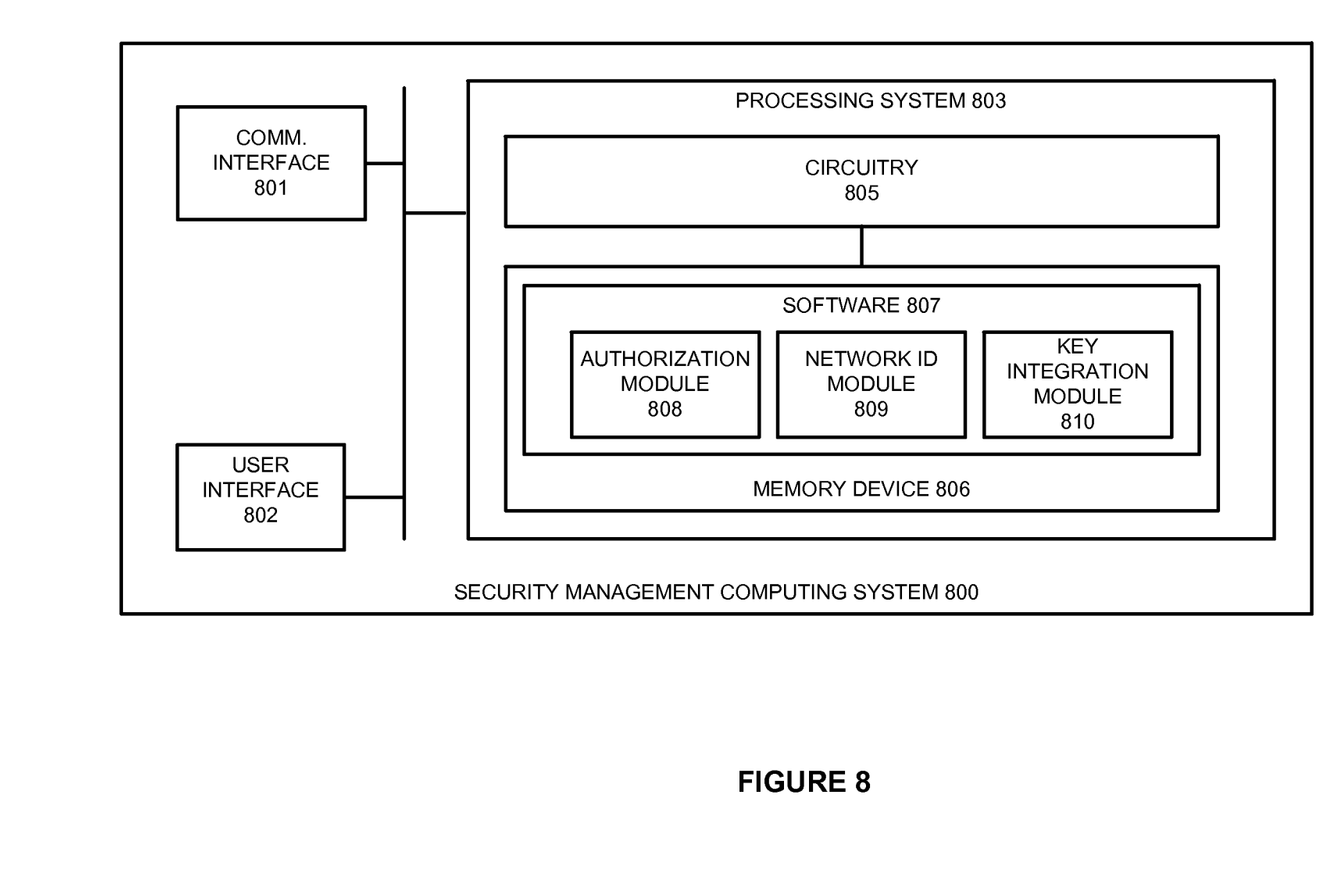
FIG. 8 illustrates a computing system for secure wireless communication device handoffs.

Referring now to FIG. 8, FIG. 8 illustrates a security management computing system 800 according to at least one example. Security management computing system 800 is an example of a security module, such as second security management module 131 or second security management module 453, although other examples may exist. Computing system 800 may be configured to operate wholly or partially in an ePDG in some examples, although computing system 800 may be implemented anywhere within a communication network. Computing system 800 includes communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof. The wireless protocols may include Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format, including combinations, variations, or improvements thereof. Communication interface 801 is configured to facilitate the handoff of wireless communication devices from one communication network to another communication network. These handoffs include authorizing the device using security keys and gathering any previous security key that was used by the wireless device.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes authorization module 808, network identification module 809, and key integration module 810. Operating software 807 may include an operating system, utilities, drivers, network interfaces, applications, or some other type of software. When executed by circuitry 805, operating software 807 directs processing system 803 to operate computing system 800 as described herein.

In particular, communication interface 801 is configured to receive a secure authorization request from a wireless communication device that is attempting to transition from another communication network. Authorization module 808 is configured to authorize the device based on a security key or passphrase. In some examples, computing system 800 may generate a random value to be sent to the device. The device may then process the random value using the security key, and return the processed random value to computing system 800. Once the processed value has arrived, authorization module 808 can compare that value to an expected returned value to authorize the device.

After being authorized, network identification module 809 is then configured to use communication interface 801 to identify other networks or networked devices that may possess security keys that were used by the device in the communication. In some examples, the wireless device may be configured to automatically pass the location identifiers to computing system 800. In other examples, computing system 800 must inquire the wireless device for the identity of the network or network device.

Once the location of the security keys is identified, computing system 800 is then configured to gather the security keys from the one or more locations using communication interface 801. These gathered keys may then be integrated together with key integration module 810. In some examples, the integration of the keys is necessary to maintain the devices original communication. In other instances, maintaining the keys is a method of verifying the communication as it is passed between communication networks.

Although illustrated with three software modules in the present example, it should be understood that computing system 800 may include any number of software modules to facilitate a secure handoff of a wireless communication device.

Returning now to FIG. 1, communication networks 120-121 comprise network elements that provide communication services to WCD 110. The wireless networks may comprise switches, wireless access nodes, Internet routers, network gateways, application servers, computer systems, communication links, or some other type of communication equipment—including combinations thereof. Further, communication networks 120-121 include first and second security management modules 130-131, which are used to provide authorization to WCD 110 to use the communication networks. Security management modules 130-131 may include hardware, firmware, software, or any other element to provide the security operations described herein. It should be understood that although first security management module 130 is illustrated within first communication network 120, management module 130 may be implemented in server 140 in some examples.

WCD 110 comprises RF communication circuitry and an antenna. The RF communication circuitry typically includes an amplifier, filter, modulator, and signal processing circuitry. WCD 110 may also include a user interface, memory device, software, processing circuitry, or some other communication components. WCD 110 may be a telephone, computer, e-book, mobile Internet appliance, wireless network interface card, media player, game console, or some other wireless communication apparatus—including combinations thereof.

Wireless sectors 180-181 include wireless links that use the air or space as a transport media. These wireless links may communicate using Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

Communication links 170-172 use metal, glass, air, space, or some other material as the transport media. Communication links 130-132 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 130-132 could be direct links or may include intermediate networks, systems, or devices.

Server 140 may include any computing device capable of processing data requests for wireless communication devices, such as WCD 110. Server 140 may include a storage system, a processing system, a communication interface, and a user interface, amongst other possible systems. In some examples, server 140 may be configured as a VoLTE gateway to facilitate VoLTE communications between multiple devices. In such instances, server 140 may include first security management module 130 to authorize the communication from WCD 110.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a first communication network to facilitate a communication handoff for a wireless communication device comprising:
   receiving, in the first communication network, a request for authorization from the wireless communication device to communicate with the first communication network;
   in response to receiving the request, authorizing, by the first communication network, the wireless communication device to communicate with the first communication network based on a first security key;
   receiving, in the first communication network, an identifier for a second communication network from the wireless communication device;

identifying, by the first communication network, a second security key, wherein the wireless communication device has been authorized to communicate, based on the second security key, with the second communication network; and integrating, by the first communication network, the second security key with the first security key to facilitate communication between the wireless communication device and a server over the first communication network.

2. The method of claim 1 wherein the first communication network is configured to communicate with the wireless communication device using Wireless Fidelity format.

3. The method of claim 2 wherein the second communication network is configured to communicate with the wireless communication device using Long Term Evolution format.

4. The method of claim 1 wherein identifying, by the first communication network, the second security key comprises retrieving the second security key from a security management module within the second communication network.

5. The method of claim 1 wherein the server comprises a Voice over Long Term Evolution (VoLTE) gateway.

6. The method of claim 5 wherein identifying, by the first communication network, the second security key comprises retrieving the second security key from a security management module on the VoLTE gateway using at least a portion of the first communication network.

7. The method of claim 1 further comprising:
identifying a security key request from a third communication network; and
transferring the second security key and the first security key to the third communication network.

8. A computing system for operating a first communication network to facilitate a communication handoff for a wireless communication device comprising:
a communication interface configured to:
receive a request for authorization from the wireless communication device to communicate with the first communication network;
in response to authorizing the wireless communication device to communicate with the first communication network, receive an identifier for a second communication network from the wireless communication device; and
after receiving the identifier for the second communication network, receive a second security key from the second communication network; and
a processing system configured to:
in response to receiving the authorization request, authorize the wireless communication device to communicate with the first communication network based on a first security key; and
upon receiving the second security key, integrate the second security key with the first security key to facilitate communication between the wireless communication device and a server over the first communication network.

9. The computing system of claim 8 wherein the first communication network communicates with the wireless device using Wireless Fidelity (WIFI) format.

10. The computing system of claim 9 wherein the second communication network communicates with the wireless device using Long Term Evolution (LTE) format.

11. The computing system of claim 8 wherein the communication interface is further configured to transfer a security key request to a security management module within the second communication network, and wherein the communication interface configured to receive the second security key from the second communication network is configured to receive the second security key from the second communication network after transferring the security key request.

12. The computing system of claim 8 wherein the server comprises a Voice over Long Term Evolution (VoLTE) gateway.

13. The computing system of claim 8 wherein the communication interface is further configured to transfer a security key request to a security management module on the VoLTE gateway using at least a portion of the second communication network, and wherein the communication interface configured to receive the second security key from the second communication network is configured to receive the second security key from the second communication network after transferring the security key request.

14. The computing system of claim 8 wherein the communication interface is further configured to:
receive a secondary security key request from a third communication network; and
transfer the second security key and the first security key to the third communication network.

15. A method of operating a secondary communication network to rollover a Voice over Long Term Evolution (VoLTE) communication comprising:
identifying a request for authorization from a wireless communication device to communicate with the secondary communication network;
in response to the authorization request, authorizing the wireless communication device to communicate with the secondary communication network using a first security key;
receiving, from the wireless communication device, a location identifier for a gateway associated with a second security key for the wireless communication device;
based on the location identifier, obtaining the second security key from the gateway; and
integrating the second security key with the first security key to facilitate the VoLTE communication using the secondary communication network.

16. The method of claim 15 wherein the secondary communication network is configured to communicate using Wireless Fidelity (WIFI) format.

17. The method of claim 15 wherein the location identifier for the gateway comprises a location for a VoLTE gateway.

18. The method of claim 17 wherein obtaining the second security key from the gateway comprises:
transferring a security key request to the VoLTE gateway; and
receiving the second security key in a security key response from the VoLTE gateway.

19. The method of claim 15 wherein the request for authorization occurs in response to the wireless communication device transitioning from a first communication network to the secondary communication network.

20. The method of claim 19 wherein the first communication network is configured to communicate using Long Term Evolution (LTE) format.

* * * * *